A. KADOW.
MOLD FOR GLASS GATHERING MECHANISMS.
APPLICATION FILED NOV. 14, 1914.
1,223,392.
Patented Apr. 24, 1917.
3 SHEETS—SHEET 2.
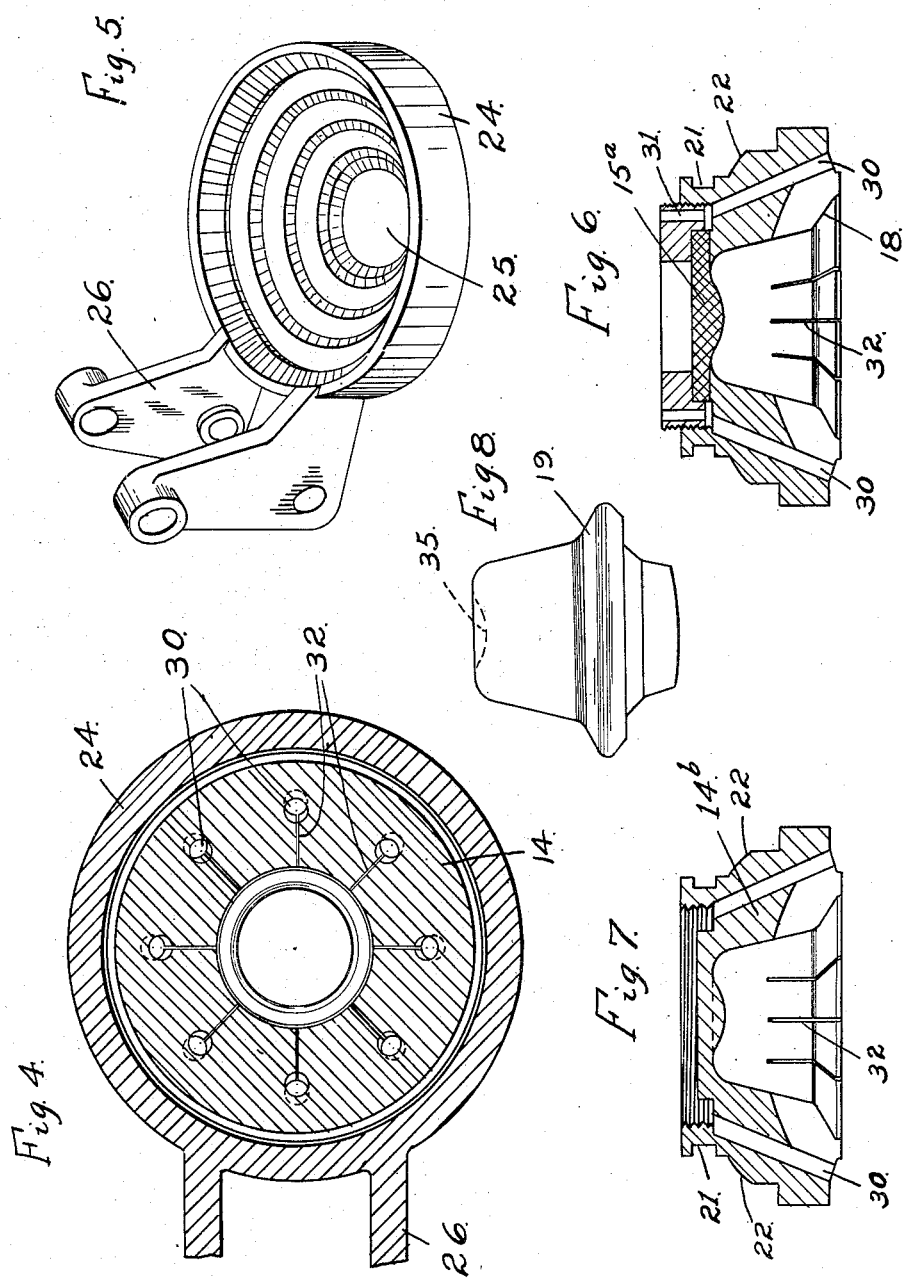
WITNESSES:
H. M. Gillespie
J. B. Lagorio, Jr.
INVENTOR.
August Kadow
BY Barnett & Numan
ATTORNEYS A. KADOW.
MOLD FOR GLASS GATHERING MECHANISMS.
APPLICATION FILED NOV. 14, 1914.
1,223,392.
Patented Apr. 24, 1917.
3 SHEETS—SHEET 3.
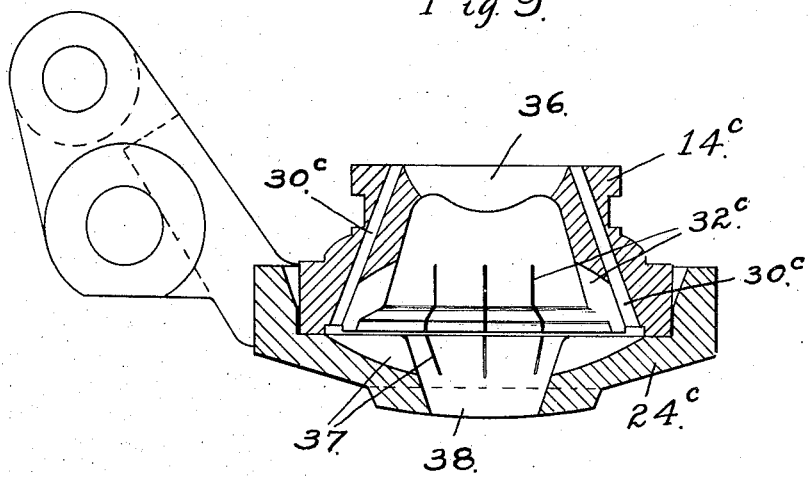
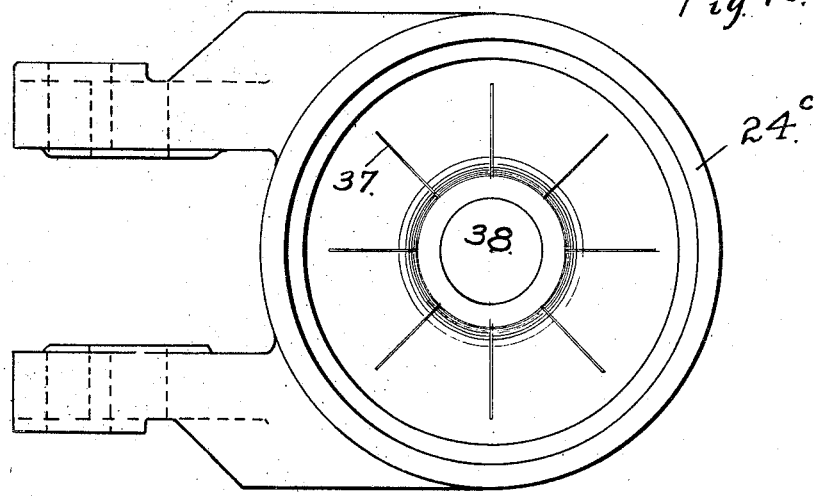
WITNESSES:
H. M. Gillespie
J. B. Lagorio Jr.
INVENTOR.
August Kadow
BY Barnett Truman
ATTORNEYS

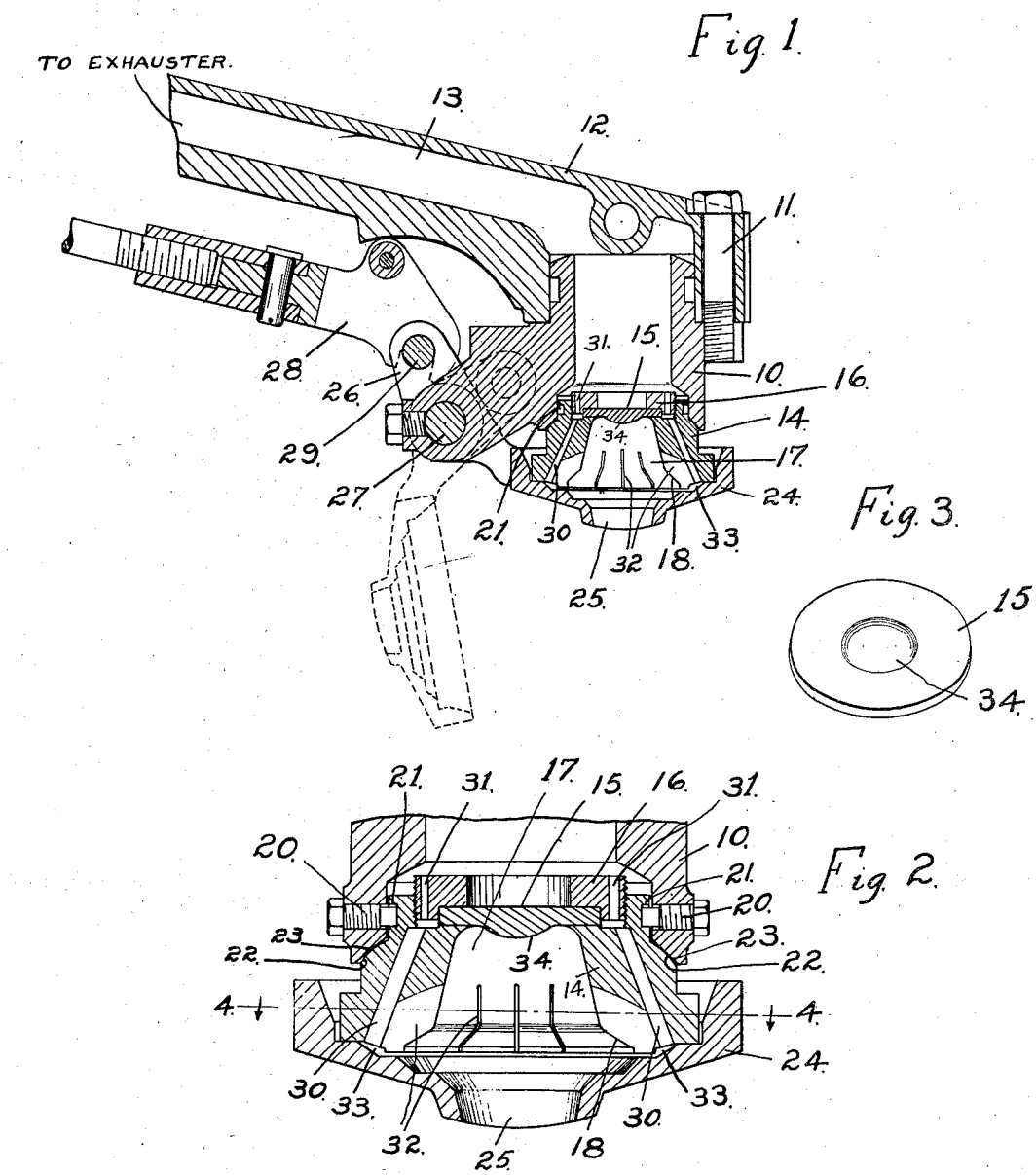

UNITED STATES PATENT OFFICE.

AUGUST KADOW, OF TOLEDO, OHIO, ASSIGNOR TO THE WESTLAKE MACHINE COMPANY, OF TOLEDO, OHIO, A CORPORATION OF OHIO.

MOLD FOR GLASS-GATHERING MECHANISMS.

1,223,392.      Specification of Letters Patent.      Patented Apr. 24, 1917.

Original application filed September 7, 1912, Serial No. 719,178. Divided and this application filed November 14, 1914. Serial No. 872,192.

*To all whom it may concern:*

Be it known that I, AUGUST KADOW, a citizen of the United States, residing at Toledo, in the county of Lucas and State of Ohio, have invented certain new and useful Improvements in Molds for Glass-Gathering Mechanisms, of which the following is a specification.

My invention relates to gathering mechanism for machines for making glass articles in which the molten glass is drawn into the gathering mold by suction. The application is a division of my co-pending application Serial No. 719,178, filed September 7, 1912, for gathering mechanism for glass making apparatus. The application just referred to relates to the gathering mechanism as a whole. The present application has reference particularly to the construction of the gathering mold *per se*. The glass gathering mechanism disclosed in this application and in the parent application Serial No. 719,178, was devised particularly as an improvement upon the glass gathering means forming part of a machine for automatically manufacturing electric light bulbs disclosed in my application Serial No. 570,621, filed July 6, 1910; practical experience with this machine having demonstrated that in order that the machine should operate with the highest degree of efficiency and reliability, certain changes in the devices employed for gathering the glass and forming the same into blanks for blowing were necessary.

In the operation of the machine shown in application Serial No. 570,621, the glass is drawn from the glass furnace by suction into a gathering mold which is thereupon withdrawn from the furnace and caused to deliver the blank of glass to a spindle. The spindle after receiving the blank is inverted and put through certain oscillatory movements during which air is introduced into the blank, the formation of the article from said blank being accomplished by the air blast and by gravity, and the operation completed in a finishing mold.

The present invention has for its principal objects:

First. To produce a mold so formed that the blanks molded therein will be discharged and delivered to the spindle at precisely the right moment. Some difficulty in this regard was experienced in the operation of the machine as originally constructed.

Second. To construct the mold so that the blanks produced thereby will have the configuration and character such that the hollow articles, electric light bulbs, for example, blown therefrom will be of uniform thickness from end to end. If the glass is thicker in one part of the bulb than in another the bulb will crack when subjected to the heat produced by the incandescence of the filament.

Third. To provide an arrangement of the exhaust ports in the mold whereby the mold is completely filled by the molten glass, thereby insuring perfect uniformity in the blanks.

Fourth. To provide a mold consisting of a main body portion and an annular neck mold element so arranged with respect to each other, and with respect to the part of the machine on which they are supported, that a close and proper fit will be made between these parts when brought together.

The invention has for further objects such other new and improved arrangements, constructions and devices relating to molds for glass forming machinery as will be hereinafter described and claimed. While, as stated, the mold of my present invention is intended particularly to form a part of the machine such as that disclosed in application Serial No. 570,621, it is realized that a mold so constructed might have utility in other connections where analogous conditions prevailed.

The invention is illustrated, in certain preferred embodiments, in the accompanying drawings wherein—

Figure 1 is a vertical sectional view of a mold constructed in accordance with my invention and of adjacent portions of the glass gathering mechanism of which the mold forms a part.

Fig. 2 is a detail sectional view of the mold shown on a larger scale.

Fig. 3 is a view, in perspective, of a disk which, in this embodiment of the invention, forms the upper part of the mold.

Fig. 4 is a sectional plan taken on line 4—4 of Fig. 2.

Fig. 5 is a view, in perspective, of the lower or hinged element of the mold.

Figs. 6 and 7 are detail sectional views of modifications of the upper mold element.

Fig. 8 is a view, in elevation, of the blank produced by the gathering mold.

Fig. 9 shows, in section, certain other modifications in the construction of both the upper and lower mold elements, and Fig. 10 is a plan view of the lower mold element.

Like characters of reference designate like parts in the several figures of the drawings.

Referring first to Figs. 1 to 5 inclusive, the gathering mold is shown as supported on the hollow member 10 attached by bolts 11 to a gathering member 12, the latter formed with a port 13 communicating with an exhausting device (not shown). The upper mold element consists of a body portion 14 and a separately formed top piece 15 held in place on the body portion by a nut 16. The mold cavity 17 is tapered from the bottom to the top, the taper near the bottom being abrupt as shown at 18, so as to produce the rib or circular projection 19 on the blank as shown in Fig. 8. The upper end of the mold element 14 fits into the open end of the supporting member 10, the connection between these parts being a loose one provided by screws 20 which enter a slot 21, somewhat wider than the diameter of the screws, formed in the mold element. The mold element and the supports are formed with annular bearing surfaces 22, 23, one of which, for example the surface 22 on the mold element, is rounded. The lower mold element 24 is annular in form, having an opening 25 in the center thereof through which the glass is drawn into the mold from the glass furnace. The lower mold element is provided with a clevis 26 pivoted by means of pivot pin 27 to a projecting web on the support 10. The lower mold element is moved to and away from the upper mold element by means of a rod 28 engaging a cross pin 29 on the clevis 26.

The upper mold element is formed with a plurality of circularly arranged exhaust ports 30 communicating with exhaust ports 31 in the nut 16 which, in turn, communicate with the interior of the supporting member 10 and exhaust port 13 in gathering member 12. The upper mold element is formed with a number of very fine saw cuts 32 which extend from the mold cavity to the exhaust ports 30. These ports are connected at the bottom by an annular space 33 which opens into the mold cavity. The disk 15 which constitutes the top of the mold is formed with a preferably rounded protuberance 34.

In the glass forming apparatus shown in application Serial No. 570,621, referred to above, the mold cavity in the upper mold element was not tapered. It was simply rounded at the top. As a result the blanks had a tendency to stick in the mold. To overcome this the mold was tapered. It was found, however, that bulbs blown from these tapered blanks had walls which were a trifle thicker at the end than at the neck. This was probably due to the fact that by diminishing the cross sectional area of the blank at the tip the tip congealed more rapidly than the rest of the blank. It is possible that the shape of the blank as affecting the flow of the glass due to gravity contributed to this undesirable result. I have found that this defect of operation may be cured by forming the upper end wall of the mold with a protuberance or convexity which produces a depression 35 (Fig. 8) in the tip of the blank. When a blank formed in this manner is blown into a bulb, under proper conditions, the wall will be uniform throughout, the glass at the end of the bulb being no thicker than that at the neck. This is in part due to the fact that a blank so formed does not cool at the tip as rapidly as one having a more rounded tip. This effect is enhanced by making the wall of the mold at the inner or upper end of the cavity separate from the body portion of the mold and of less thickness. The top element, under such circumstances, once heated up to its thermal capacity becomes a poor conductor of heat from the portion of the blank in contact therewith. The body portion of the mold is ordinarily made of metal, of copper for example, and the top mold element may be made of the same metal or, if desired, of a metal or other material of smaller thermal capacity than copper. For example, I have found that by making the top mold element of graphite, as indicated at 15ᵃ (Fig. 6), the tip of the blank may, when this is expedient, be kept softer and hotter than is possible with a mold in which the inner end of the cavity is of metal. Under some conditions it is not necessary to make the top of the mold separate from the body portion. The convex configuration of the surface at the inner end of the mold cavity will often give the desired result. An integral mold of this sort is shown in Fig. 7 and designated 14ᵇ.

In Figs. 9 and 10 I have shown a glass gathering mold modified in certain respects. The upper mold element 14ᶜ is made in one piece and in addition to the exhausting slits 32ᶜ in the sides of the mold there is also a slit 36 through the top. This insures the upper end of the mold cavity being completely filled with the molten glass. The lower mold element 24ᶜ is formed with a series of radial slits 37 by means of which air may be exhausted directly from the central opening 38 into the exhaust ports 30ᶜ.

While I have described my invention in certain preferred embodiments, further modifications might be made without departure from the principles of the invention. Therefore I do not wish to be considered as limiting the invention to the particular constructions, arrangements and devices shown and described except so far as the claims are specifically so limited.

I claim:

1. In a machine for manufacturing glass articles, the combination with a support, of an upper mold element rockingly suspended on said support and having a cavity open at the bottom, and a lower annular mold element hinged to said support in position to bear against the under side of said upper mold element to close said cavity.

2. In a machine for manufacturing glass articles, the combination with a support, of an upper mold element having a loose connection with said support and provided with a mold cavity open at the bottom, and an annular mold element hinged to said support in position to bear against the under side of said upper mold element.

3. In a machine for manufacturing glass articles, the combination with a support, of a mold element on said support having a cavity tapered inwardly first abruptly and then gradually, and an annular mold element adapted to fit over the open end of the first named element which coöperates with said first named element to form a blank having an outstanding flange, said upper mold element formed with exhaust ports and both elements formed with radial slits which put the interior of the mold in communication with said exhaust ports.

4. In a machine for manufacturing glass articles, the combination with a hollow supporting member, of an upper mold element which fits within said supporting member and is loosely connected therewith, and a lower mold element hinged to said support and adapted to bear against the under side of said upper mold element.

5. In a machine for manufacturing glass articles, the combination with a hollow supporting member, of a mold element which fits within said supporting member and is loosely connected therewith, and an annular lower mold element hinged to said support and adapted to bear against the under side of said upper mold element.

6. In a machine for manufacturing glass articles, the combination with a hollow supporting member, of an upper mold element which fits within said supporting member and is loosely connected therewith, and a lower mold element hinged to said support and adapted to bear against the under side of said upper mold element, said support and upper mold element being formed with co-engaging surfaces one of which is rounded.

7. In a machine for manufacturing glass articles, the combination with a hollow support, of an upper mold element adapted to fit into the end of said support and formed with a circumferential recess, screws in the support which extend loosely into said recess, and an annular lower mold element hinged to said support.

8. In a machine for manufacturing glass articles, the combination with a hollow support, of an upper mold element adapted to fit into the end of said support and formed with a circumferential recess, screws in the support which extend loosely into said recess, and an annular lower mold element hinged to said support, said upper mold element and support being formed with co-engaging annular surfaces, one of which is rounded.

9. A suction mold provided with a metal inlet port at one end, the side wall of the mold chamber, spaced from each end, being provided with exhaust ports.

10. In a machine for making hollow glass articles, a mold for forming blanks for blowing comprising a mold element having a cavity of diminished cross sectional area inwardly, the inner end of which is defined by a convex surface, said mold element formed with a plurality of radial slits providing exhaust ducts.

11. In a machine for making hollow glass articles, a mold for forming blanks for blowing comprising a mold element having a cavity of diminished cross sectional area inwardly, the inner end of which is defined by a convex surface, said mold element formed with a plurality of radial slits and a slit into the cavity at its inner end which provide exhaust ducts.

12. In a machine for making hollow glass articles, a mold for forming blanks for blowing comprising a metal body part, and a separately formed element made of graphite defining the inner end of the mold cavity.

13. In a machine for making hollow glass articles, a mold for forming blanks for blowing comprising a metal body part, and a separately formed element made of graphite defining the inner end of the mold cavity, the inner surface of which is convex.

14. A gathering mold provided with an end wall of relatively high heat absorptive capacity.

15. A gathering mold provided with an end wall of a higher heat absorptive capacity than the body of the mold.

16. A gathering mold having a separable end wall of material of higher heat absorptive capacity than the body of the mold.

17. A gathering mold provided intermediate its ends with exhaust ports and at its inner end with a convex wall of higher heat absorptive capacity than the body of the mold.

18. A suction mold provided with a metal inlet port at one end, the opposite end of the mold chamber being convex, the side wall of the mold chamber, spaced from each end, being provided with exhaust ports.

19. Mechanism for gathering blanks for blowing, comprising a gathering mold imperforate at its inner end and provided with ports spaced outwardly from such imperforate surface, and means for exhausting air from said mold through said ports to gather molten glass into said mold by suction, whereby undue chilling of the inner end of the gather is avoided.

AUGUST KADOW.

Witnesses:
  WILBER OWEN,
  S. T. KLOTZ.